US006523891B1

(12) United States Patent
Yates

(10) Patent No.: US 6,523,891 B1
(45) Date of Patent: Feb. 25, 2003

(54) MULTI-SHELL BICYCLE SADDLE

(76) Inventor: Paul M. Yates, 5814 Briar Tree, La Canada, CA (US) 91011

( * ) Notice: Subject to any disclaimer, the term of this patent is extended or adjusted under 35 U.S.C. 154(b) by 0 days.

(21) Appl. No.: 09/904,272

(22) Filed: Jul. 11, 2001

(51) Int. Cl.⁷ .................................................. B62J 1/18
(52) U.S. Cl. ................ 297/202; 297/195.1; 297/215.16
(58) Field of Search .............................. 297/195.1, 202, 297/214, 215.16, 440.22

(56) References Cited

U.S. PATENT DOCUMENTS

| | | | | |
|---|---|---|---|---|
| 5,765,912 A | * | 6/1998 | Bontrager | 297/201 |
| 5,911,473 A | * | 6/1999 | Hill | 297/195.1 |
| 6,244,655 B1 | * | 6/2001 | Minkow et al. | 297/202 |
| 6,322,139 B1 | * | 11/2001 | Chuang | 297/195.1 |
| 6,402,234 B1 | * | 6/2002 | Yu | 248/298.1 |

FOREIGN PATENT DOCUMENTS

FR            02513586 A1 *  4/1983  ............ 197/215.16

* cited by examiner

Primary Examiner—Peter M. Cuomo
Assistant Examiner—Stephen D'Adamo
(74) Attorney, Agent, or Firm—Walter A. Hackler

(57) ABSTRACT

A bicycle saddle system includes a plurality of molded bottom shells, each having a different resiliency, a plurality of molded top shells, each having a different resiliency and rails for attaching the bicycle saddle to a bicycle. Grooves in the top and bottom shells are provided for releasably fixing the rails therebetween and a cushion is removably attached to one of the top and one of the bottom shells. Selection of top and bottom molded shells provides for tailoring resiliency of the bicycle saddle.

14 Claims, 3 Drawing Sheets

MULTI-SHELL BICYCLE SADDLE

The present invention is generally directed to the field of bicycle saddles or the like, and is more particularly directed to a bicycle saddle which is easily assembled and provides resilient cushioning for a rider without the use of springs or the like.

Typical bicycle saddles generally include a seat portion and a support frame with the saddle being generally horizontal along a longitudinal axis with a horn or pommel, and a substantially wider tail portion. The seat generally includes a shell or frame which may be molded plastic covered by a suitable cushion material.

Most saddles utilize a support frame which includes a pair of support rails that extend along the longitudinal axis of the saddle and are fixed to the underside of the frame. In addition, in order to provide a more resilient ride, springs are typically included in the saddle configuration for providing a suspension system for the saddle in order to reduce discomfort when riding over rough terrain. Without such springs, a typical saddle utilizes only padding for absorbing vibrations caused by bumps or unevenness in the road which are transmitted directly to the rider.

The typical spring suspension systems are expensive to manufacture and install and require a multitude of steps and parts.

The present invention provides for a saddle which is easily assembled without the use of springs and still provides a resilient suspension for the rider in addition to a cushion or pad.

SUMMARY OF THE INVENTION

A bicycle saddle in accordance with the present invention generally includes a molded bottom shell having a horn portion with a depending horn cavity, a seat portion with a depending seat cavity and a raised area interconnecting the horn and seat portions. This molded, configuration with the raised area interconnecting, provides resiliency to the saddle, as will be hereinafter described, without the use of springs.

Rails are provided for attaching the bicycle saddle to a bicycle and areas disposed in the bottom shell, are provided for supporting the rails between the horn and seat portion and between the raised area.

In a preferred embodiment, the areas may be groves and the rails may be fixed into the grooves by a molded top shell which is shaped and sized for nesting within the bottom shell. More particularly, the grooves include a horn grove disposed in a bottom of the depending horn cavity and a pair of seat grooves disposed in the bottom of the depending seat cavity. The horn groove is spaced apart from the pair of seat grooves.

Alternatively, the rails may be fixed into the depending groves by clamps disposed into the depending horn and seat cavities proximate the horn grooves and the seat grooves respectively.

The cushion may be molded with threaded members for receiving screws extending through the top and bottom molded shells for securing the cushion over the top and bottom molded shells together with the rails clamped between the top and bottom molded shells. Thus, the entire saddle may by assembled by nesting the components and screwing same together.

More particularly,, the bottom shell raised area may include a hole therethrough and the top shell, and cushion each may include holes therethrough with the holes being aligned with one another. This provides for ventilation through the saddle for the comfort of the rider. In addition, the cushion may include a shoulder around a lower perimeter thereof with the shoulder extending inwardly from the cushion side and the bottom shell may include a flared upper perimeter for engaging the cushion shoulder with the bottom shell perimeter being flush with the cushion side.

BRIEF DESCRIPTION OF THE DRAWINGS

The advantages and features of the present invention will be better understood with the following detailed description when considered in conjunction with the accompanying drawings of which.

DETAILED DESCRIPTION

With reference to FIGS. 1–4, there is shown a bicycle saddle 10 in accordance with the present invention which includes a molded bottom shell 12, molded top shell 14 and cushion 16. The bottom shell 12 and top shell 14 may be molded from any suitable material having suitable rigidity and flexibility to support a rider (not shown) seated on the cushion 16. The cushion 16 may be formed from any suitable material as for example, a gel made in accordance with any one of the following U.S. Pat. Nos. 5,679,193, 5,756,184, 5,932,046, 5,993,584, 6,007,149, 6,027,674, 6,030,035 to Yates, all of which are to be incorporated herewith in their entirety by the specific reference thereto.

Rails 20 are provided for attaching the bicycle saddle 10 to a bicycle (not shown).

Figure 2:
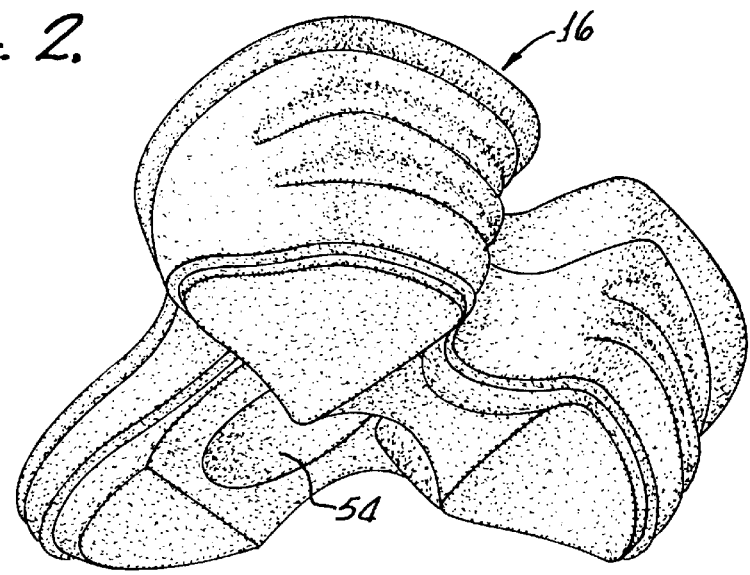
FIG. 2 is an exploded perspective view of the saddle shown in FIG. 1 taken from a bottom perspective and showing the saddle comprising only three components, namely, a bottom shell, top shell, and cushion which are assembled through the use of screws as hereinafter described in greater detail.
Figure 2:
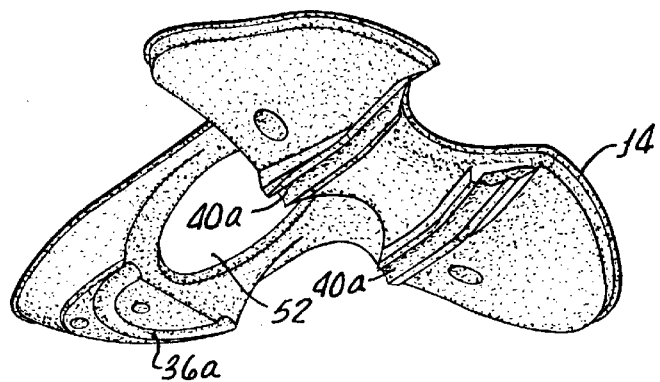
Figure 2:
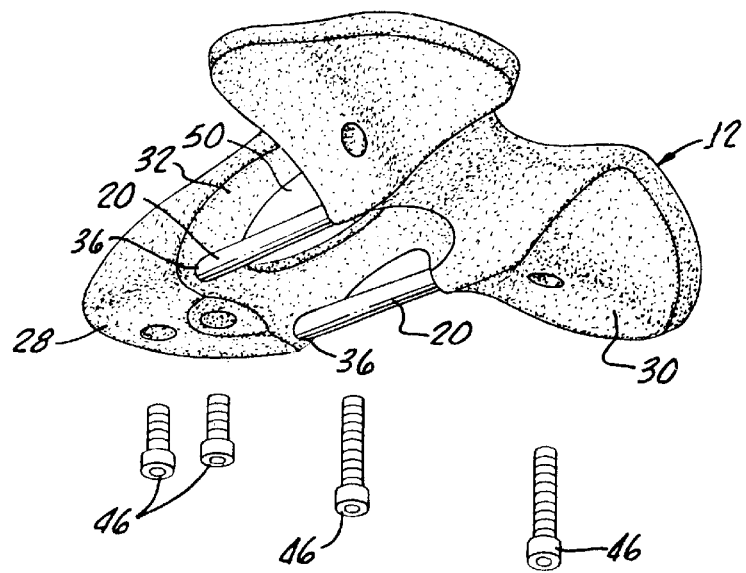

As most clearly shown in FIG. 2, the bottom shell 12 includes a depending horn cavity 28 a depending seat cavity 30 with a raised area 32 therebetween. This molded structure provides resiliency between the horn cavity 28 and seat cavity 30, which in turn, provides a spring-like quality to the saddle 10 without the actual use of springs (not shown).

To minimize structural complexity, specific areas, such as, for example, grooves 36 (see FIG. 2) disposed in the depending horn cavity 28 and grooves 40 in the depending seat cavity 30 (see FIG. 4) provide a means for supporting the rails 20 between the horn 28 and the seat portions 30 under the raised portion 32. The top shell 14 may have corresponding areas or grooves 36a, 40a to provide a means for fixing the rails 14 in the grooves 36, 40. It should be appreciated that while specific groves 36, 40 have been shown to support the rails 20, other surface areas such as recesses, or spaced apart ribs, mounds, dimples or the like, not shown, may be utilized for rail 20 support on the bottom shell 30 or between the bottom shell 12 and top shell 14.

Figure 1:
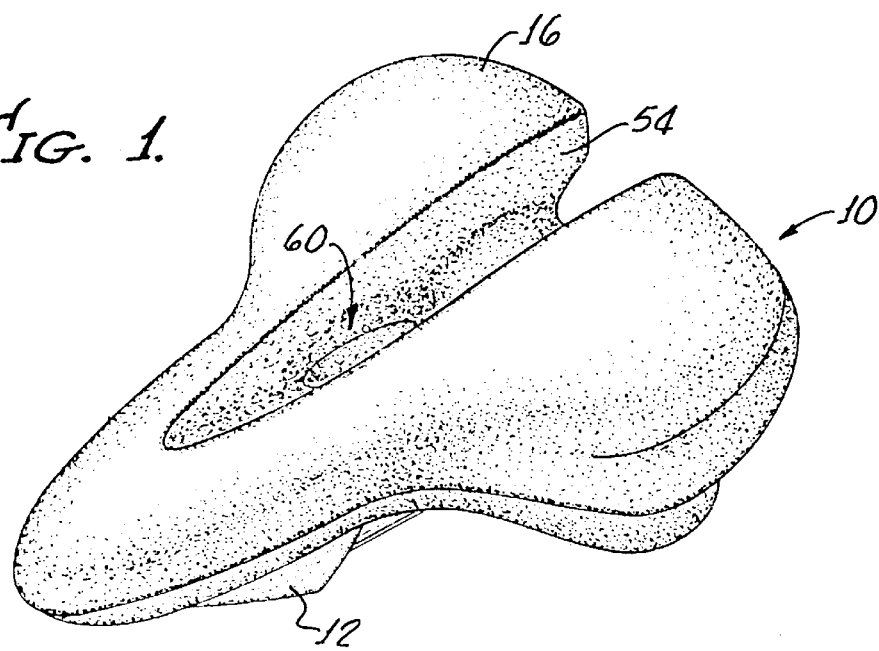
FIG. 1 is a perspective view of a bicycle saddle in accordance with the present invention generally showing a molded bottom shell with a cushion disposed thereover.
Figure 3:
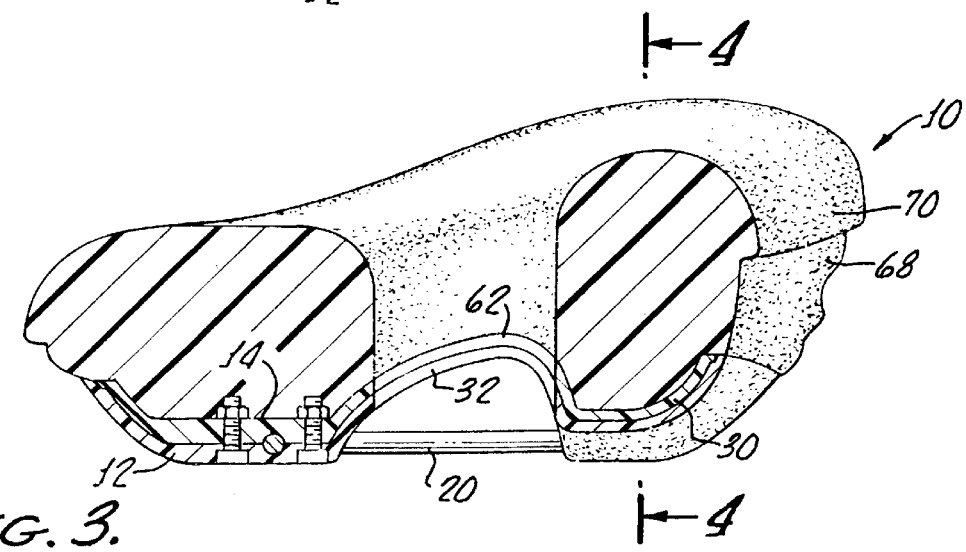
FIG. 3 is a cross-sectional view of the saddle shown in FIGS. 1 and 2 more clearly showing the molded bottom shell having a horn portion with a depending horn cavity, a seat portion with a depending seat cavity and a raised area interconnecting the horn and seat portions along with rails clamped between the top and bottom shells and beneath a raised area interconnecting the horn and seat portions.
Figure 4:
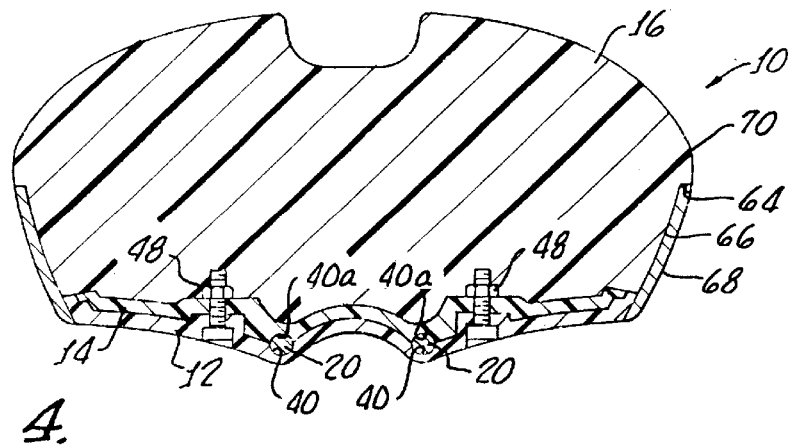
FIG. 4 is a cross-sectional view of the saddle shown in FIG. 3 taken along line 4—4.

In the embodiment 10 shown in FIG. 3–4, bolts 46 and nuts 48, extending through the bottom shell 12 and top shell 14, fix the top shell 14 to the bottom shell 12 with the rails 20 positioning and therebetween and nested in the grooves 36, 40. As shown, the top shell 14 is shaped and sized for nesting within the bottom shell 12 to effect the rail 20 clamping.

In the embodiment 10 shown in FIGS. 1–4, the cushion 16 may be adhered to the top shell 14 in any conventional manner. To provide for comfort and ventilation, a hole 50 30 may be provided through the bottom shell 12 which is aligned with a hole 52 through the top shell 14 and an opening 54 through the cushion 16.

This aligned passageway which consists of the holes 52, 54 and opening 56 also provides increased resiliency of the saddle 10 in the area of the raised portion 32 of the bottom shell 10 along with a raised portion 62 of the nested top shell 14.

Manufacturing or assembly of the saddle 10 in accordance with the present invention is facilitated due to the minimum parts necessary, namely, bottom shell 12, top shell 14 and cushion 16, all of which may be molded, along with rails 20 and bolts 46 which are easily combined to form the saddle 10 with minimal labor. To provide a finished appearance, the cushion 16 may include a shoulder 64 around a lower perimeter 66 thereof and the bottom shell 12 includes a flared upper perimeter 68 which is flush with a cushion side 70, see FIG. 4. This upstanding or flared upper perimeter or portion 68 also provides firmness to support the cushion 16 to prevent significant expansion horizontally and provide edges strength to the cushion 16.

Figure 5:
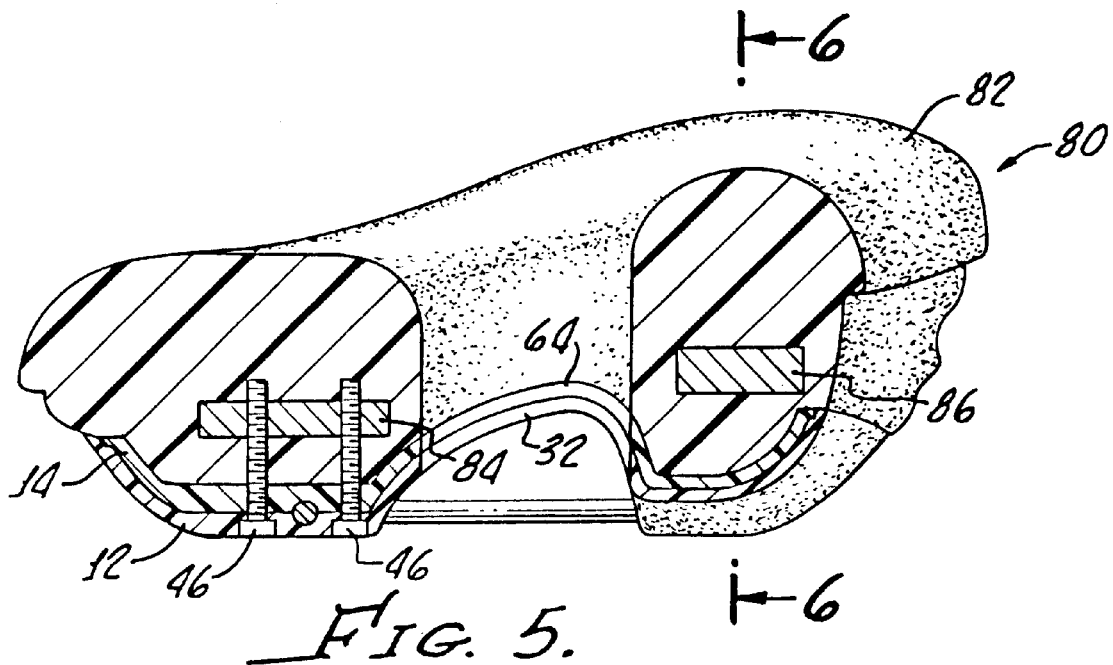
FIG. 5 is a cross-sectional view of an alternative embodiment in accordance with the present invention in which the cushion is molded with threaded members for receiving screws for assembly.
Figure 6:
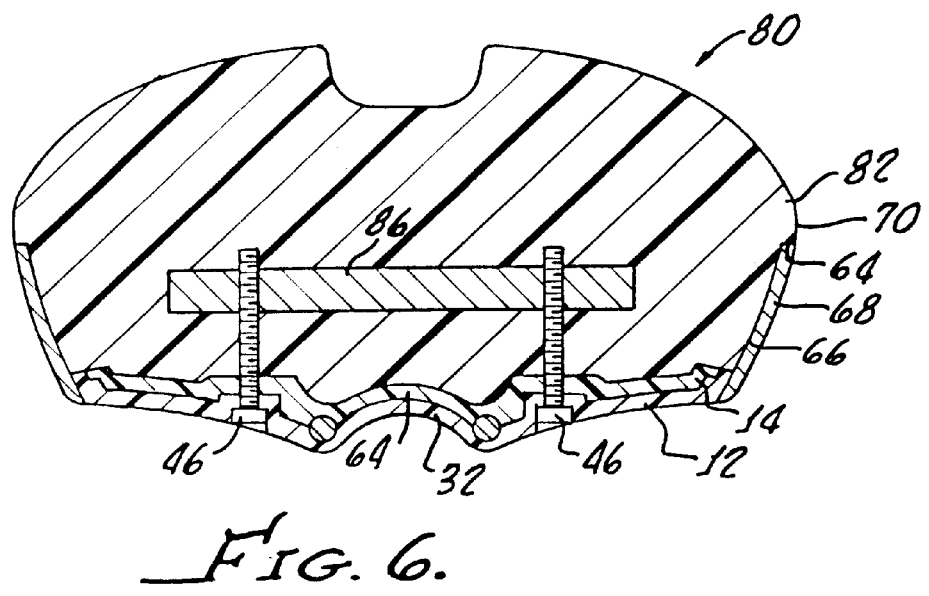
FIG. 6 is a cross-sectional view of the saddle shown in FIG. 5 taken along line 6—6.

With reference to FIGS. 5 and 6, there is shown an alternative embodiment of the saddle 80 in accordance with the present invention utilizing the bottom shell 12 and top shell 14 as herein above described. Common reference numbers in FIGS. 5 and 6 with those of FIGS. 1–4, represent components which are identical or substantially similar.

A cushion 82 of the s addle 80 as shown in FIGS. 5 and 6, include threaded members 84, 86 which are molded thereinto in a conventional manner for receiving the bolts 46. Accordingly, in this embodiment 80, all three major components, namely, the bottom shell 12, top shell 14 and cushion 82 are separable and exchangeable if desired. Exchangeability of components enables the assembly of the saddle 80 with bottom shells, top shells and cushions of various resiliencies (not shown) in order to modify the resilient characteristics of the saddle.

That is, the bottom shell may be formed with a raised portion 32 having thicker or thinner dimensions to control the resiliency thereof. This is also true of the corresponding raised portions 64 of the top shell 14. In addition, the cushion 82 may be molded with gels of various consistencies to further tailor the resilient qualities of the saddle 80.

Although there has been herein above described a bicycle saddle and system in accordance with the present invention for the purpose of illustrating a manner in which the invention may be used to advantage, it will be appreciated that the invention is not limited thereto. Accordingly, any and all modifications, versions, or equivalent arrangements which may occur to those skilled in the art should be considered to be within the scope of the invention as defined in the appended claims.

What is claimed is:

1. A bicycle saddle comprising:
    a molded bottom shell having a horn portion, with a depending horn cavity, a seat portion, with a depending seat cavity, and a raised area interconnecting the horn and seat portions;
    rails for attaching the bicycle saddle to a bicycle;
    areas on the bottom shell for positioning and supporting said rails between the horn and seat portion and under said raised areas, said areas including a horn groove disposed in a bottom of said depending horn cavity and a pair of seat grooves disposed in a bottom of said depending seat cavity, said horn groove being spaced apart from said pair of seat grooves;
    means for fixing said rails in said areas, said means comprising a molded top shell, shaped and sized for nesting within the bottom shell, for clamping said rails in said grooves; and
    a cushion disposed over the bottom shell.

2. The bicycle saddle according to claim 1 wherein the means for fixing said rails comprises clamps disposed in the depending horn and seat cavities proximate the horn groove and seat grooves, respectively.

3. The bicycle saddle according to claim 1 wherein said cushion is molded with threaded members for receiving screws extending through the top and bottom molded shells, for securing the cushion over the top and bottom molded shells together with the rails clamped between the top and bottom molded shells.

4. The bicycle saddle according to claim 3 wherein the bottom shell raised area includes a hole therethrough and the top shell and cushion each include a hole therethrough, all the holes being aligned with one another.

5. The bicycle saddle according to claim 3 wherein said cushion includes a shoulder around a lower perimeter thereof, said shoulder extending inwardly from a cushion side.

6. The bicycle saddle according to claim 5 wherein the bottom shell includes a flared upper perimeter for engaging the cushion shoulder, the bottom shell perimeter being flush with the cushion side.

7. A bicycle saddle comprising:
    a molded bottom shell having a horn portion, with a depending horn cavity, a seat portion, with a depending seat cavity, and a raised area interconnecting the horn and seat portions, said raised area having an opening therethrough;
    rails for attaching the bicycle saddle to a bicycle;
    grooves, disposed in the bottom shell, for supporting said rails between the horn and seat portion, below said raised area and across the raised area opening, said grooves including a horn groove disposed in a bottom of said depending horn cavity and a pair of seat grooves disposed in a bottom of said depending seat cavity, said horn groove being spaced apart from said pair of seat grooves;
    means for fixing said rail in said grooves, said means comprising a molded top shell, shaped and sized for nesting within the bottom shell, for clamping said rails in said grooves, the top shell means including an opening therein aligned with the bottom shell raised area opening; and
    a cushion disposed over the bottom shell.

8. The bicycle saddle according to claim 7 wherein the means for fixing said rails comprises clamps disposed in the depending horn and seat cavities proximate the horn groove and seat grooves, respectively.

9. The bicycle saddle according to claim 7, wherein said cushion is molded with threaded members for receiving screws extending through the top and bottom molded shells, for securing the cushion over top and bottom molded shells together with the rails clamped between the top and bottom molded shells.

10. The bicycle saddle according to claim 9 of wherein the cushion includes an opening therethrough, aligned with the opening in the top shell, opening and bottom shell raised area opening.

11. The bicycle saddle according to claim 10 wherein said cushion includes a shoulder around a lower perimeter thereof, said shoulder extending inwardly from a cushion side.

12. The bicycle saddle according to claim 11 wherein the bottom shell includes a flared upper perimeter for engaging the cushion shoulder, the bottom shell perimeter being flush with the cushion side.

13. A bicycle saddle system comprising:
   a plurality of molded bottom shells each having a different resiliency;
   a plurality of molded top shells each having a different resiliency;
   rails for attaching the bicycle saddle to a bicycle;
   grooves in the top and bottom shells for releasably fixing the rails therebetween;
   a cushion removably attachable to one of the top and one of the bottom shells.

14. The bicycle saddle according to claim 13 wherein each of the plurality of molded top shells are shaped and sized for nesting within each one of the plurality of bottom shells for clamping said rails in said grooves.

* * * * *